US009024472B2

(12) United States Patent
Magee, Jr.

(10) Patent No.: US 9,024,472 B2
(45) Date of Patent: May 5, 2015

(54) POWER STRIPS

(76) Inventor: Kimball P. Magee, Jr., Duluth, GA (US)

( * ) Notice: Subject to any disclaimer, the term of this patent is extended or adjusted under 35 U.S.C. 154(b) by 743 days.

(21) Appl. No.: 13/222,879

(22) Filed: Aug. 31, 2011

(65) Prior Publication Data

US 2013/0052872 A1 Feb. 28, 2013

(51) Int. Cl.
*H02J 1/00* (2006.01)
*H01R 25/00* (2006.01)
*H01H 3/14* (2006.01)
*H01R 13/70* (2006.01)

(52) U.S. Cl.
CPC ................ *H01R 25/003* (2013.01); *H01H 3/14* (2013.01); *H01R 13/70* (2013.01)

(58) Field of Classification Search
USPC ............................................................ 307/39
See application file for complete search history.

(56) References Cited

U.S. PATENT DOCUMENTS 5,424,903 A * 6/1995 Schreiber ...................... 361/166
2008/0268715 A1* 10/2008 Axland et al. ................ 439/650

OTHER PUBLICATIONS

ProAVmax.com website: http://proavmax.com/FURMAN-PS-8R-II-Power-Conditioner-and-Sequencer-p/frmn-ps8rii.htm; printed Sep. 1, 2011; pp. 1-5.
Amazon.com website: http://www.amazon.com/Woods-Foot-Switch-Power-Strip/dp/B001DELQ06; printed Sep. 1, 2011; pp. 1-5.
Atlas Sound website: http://www. atlassound.com/pn/SACR-191; printed Sep. 1, 2011; one page.

* cited by examiner

*Primary Examiner* — Robert L. Deberadinis
(74) *Attorney, Agent, or Firm* — Brient Globerman, LLC

(57) ABSTRACT

A power strip having two or more outlets include a sequence control module operable to sequentially activate and/or deactivate the outlets, thereby powering up or powering down each outlet separately. A pre-determined time delay, that can be set by a user, occurs between the activation and/or deactivation of the outlets. The power strip can include an off/off switch, and a foot switch operable to start the activation and/or deactivation. The foot switch can affix an electrical substrate, to which the sequence control module is attached, to the housing of the power strip.

22 Claims, 5 Drawing Sheets

POWER STRIPS

BACKGROUND

This specification is related generally to power strips.

A conventional power strip includes two or more electrical outlets (or sockets) that electrical devices can plug into. The power strip, in turn, receives power through its power cable from a single socket, thereby permitting the electrical devices plugged into the power strip to share a power source. In addition to permitting multiple electrical devices to receive power from a single socket, power strips also typically include surge protection circuits to protect electrical devices plugged into the strip from electricity surges. These circuits protect electrical devices plugged into the power strip from sudden spikes in power by acting as high speed switch to limit peak power to the electrical sockets when surges are detected.

Despite the advantages power strips provide in permitting multiple electrical devices to be close proximity by sharing a single socket, while sometimes providing features like surge protection, the use of many electrical devices drawing power from or through a common source can result in problems. One such problem is overloading, which is caused when electrical devices draw more power from a power source than is available. Even if a power strip includes overload protection to prevent it taking more power than it is intended to supply, high current-drawing electrical devices can cause circuit breakers to trip, such as home circuit breakers. This can result in damage to electrical devices plugged into the power strip, and the de-energizing of other electrical devices sharing the same circuit breaker. This problem may be exacerbated when multiple electrical devices that pull significant current are connected to a single power strip. Another problem are electrical surges, which can be harmful to electrical devices and can occur when multiple devices are simultaneously turned on or off, as often occurs when a conventional power strip is turned on or off.

SUMMARY

The present invention relates to a power strip that can sequentially power-up and power-down outlets.

In a first aspect, a power strip includes a housing, a plurality of outlets disposed in the housing and operable to receive a plurality of plugs, a sequence control module, where the sequence control module is operable to activate the plurality of outlets in a sequence, and a switch operable to start the activation of the plurality of outlets in the sequence.

Implementations can include any, all or none of the following features. The switch can be a manually operated switch that can be toggled into an open or closed state. The switch can be a foot switch including a elongated projection and a cap disposed on the elongated projection, where the foot switch is operable to be toggled into the open or closed state by the application of a downward force onto the cap. The power strip can also include an on/off switch operable to turn the power strip on or off. The power strip can also include an electrical substrate in electrical communication with the sequence control module, where the foot switch is affixed to the electrical substrate. The sequence control module can also be affixed to the electrical substrate. The foot switch can affix the electrical substrate to the housing at a substantially fixed distance from an interior surface of the housing. The foot switch can also be attached directly to a central portion of the electrical substrate.

According to another feature, the sequence control module is operable to deactivate the plurality of outlets in a sequence. The sequence control module can also be operable to deactivate the plurality of outlets in a sequence that is the reverse of the sequence to activate the plurality of outlets. Additionally, the sequence control module may be operable to deactivate the plurality of outlets in a sequence that is the reverse of the sequence to activate the plurality of outlets, even if only some of the plurality of outlets have been activated. Further, the sequence control module may be operable to activate the plurality of outlets in a sequence including a pre-determined time delay between the activation of at least some of the plurality of outlets.

According to yet another feature, the power strip can include a timer input, where the timer input establishes the length of time of the pre-determined time delay. The timer input can include a potentiometer or a rotary binary coded dip switch. The sequence control module can also be operable to deactivate the plurality of outlets in a sequence including a second pre-determined time delay between the deactivation of at least some of the plurality of outlets. The power strip can also include a second timer input, where the second timer input establishes the length of time of the second pre-determined time delay.

In another aspect, a power strip includes a housing, a plurality of outlets disposed in the housing and operable to receive a plurality of plugs, an on/off switch operable to turn the power strip on or off, and a foot switch including a elongated projection and a cap disposed on the elongated projection, where the foot switch is operable to activate the plurality of outlets, and where the foot switch is operable to be toggled into the open or closed state by the application of a downward force onto the cap.

Implementations can include any, all or none of the following features. The power strip can include an electrical substrate in electrical communication with the sequence control module, where the foot switch is affixed to the electrical substrate. The sequence control module can be affixed to the electrical substrate. The foot switch can also affix the electrical substrate to the housing at a substantially fixed distance from an interior surface of the housing. The foot switch may also be attached directly to a central portion of the electrical substrate.

In a first aspect, one method includes the actions of receiving, at a power strip, power from a power source, and upon receiving a user input at a foot switch, applying the received power to a plurality of outlets in a pre-determined activation sequence, with a pre-determined time delay between the activation of each of the plurality of outlets.

Implementations can include any, all or none of the following features. The method can include upon receiving a second user input at a foot switch, cutting the power to the plurality of outlets in a pre-determined deactivation sequence, with a second pre-determined time delay between the deactivation of each of the plurality of outlets.

Particular embodiments of the subject matter described in this specification can be implemented to realize none, one or more of the following advantages. Sequential powering and depowering of outlets in the power strip can eliminate electrical surges that may otherwise occur when electrical devices are simultaneously powered up and down by conventional power strips.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
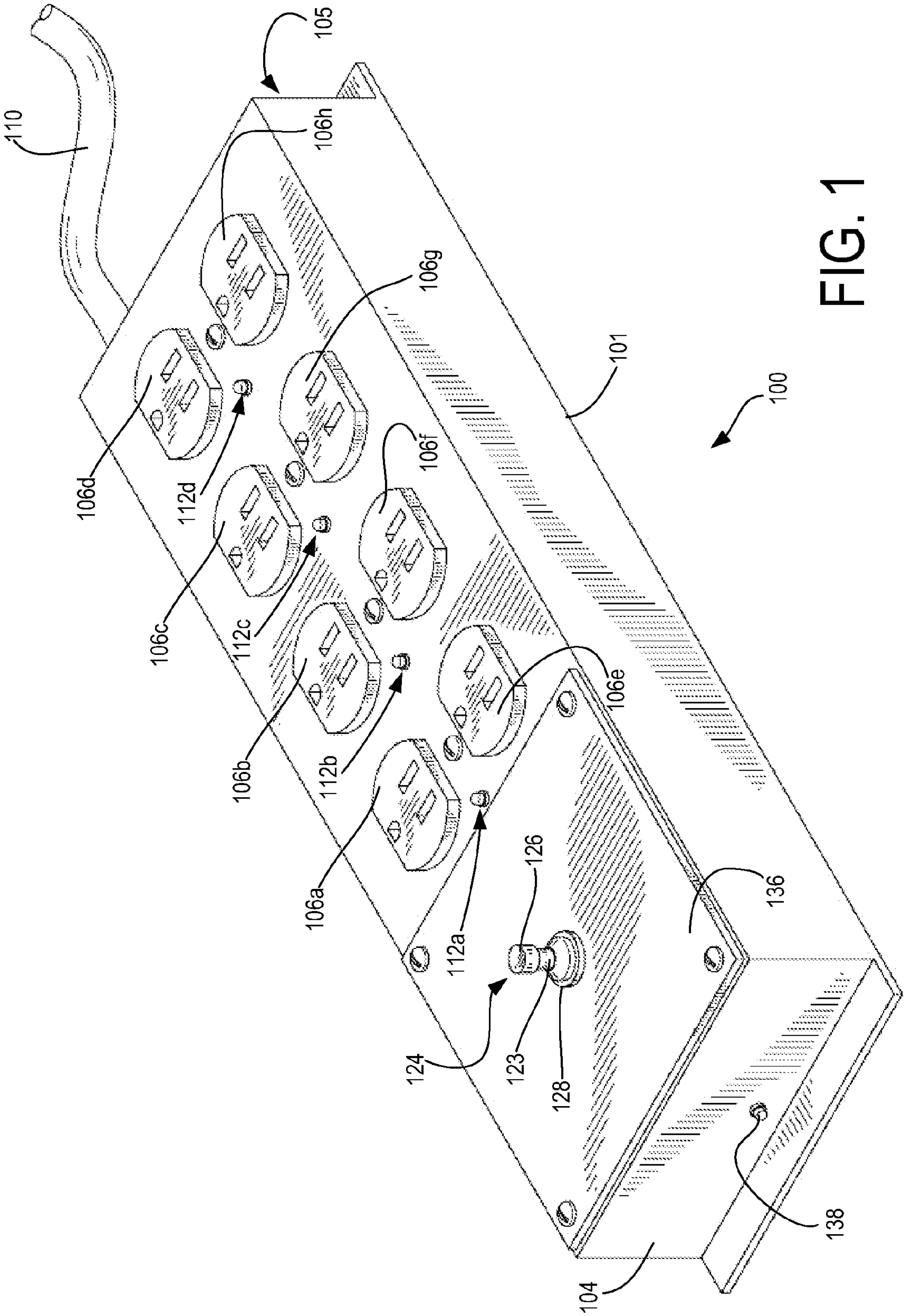
FIG. 1 shows a perspective view of an example power strip.

FIG. 1 shows a perspective view of an example power strip 100. The power strip includes a housing 101 in which power outlets 106*a*, 106*b*, . . . 106*g*, 106*h* (or sockets) are disposed, which can receive plugs from electrical devices. The housing 101 includes a first end 104 and second end 105, and may be made of conventional materials, such as aluminum, steel, plastic, or the like. A power cord 110 supplies A/C power to the power strip 100, such as from a conventional 120V (or 240V) power source. Although illustrated as having conventional 120V power outlets, it will be appreciated that the power strip 100 can include other types of outlets, including one or more outlets that may require different power supplies. For instance, the power strip 100 could include both 120V power outlets and 240V outlets, where the power cord 110 supplies sufficient power to fully power those outlets under typical loads.

In some implementations, the outlets 106*a*, 106*b*, . . . 106*g*, 106*h* of the power strip 100 may be sequentially powered-up and/or powered-down, where one or more pre-determined time delays can occur between the activation or deactivation of each outlet 106*a*, 106*b*, . . . 106*g*, 106*h*. The outlets 106*a*, 106*b*, . . . 106*g*, 106*h* in the example power strip 100 shown in FIG. 1 are paired, such that two outlets (e.g., 106*a*/106*e*, 106*b*/106*f*, 106*c*/106*g*, and 106*d*/106*h*) are powered-up or powered-down together. However, it will be appreciated that in some implementations each outlet 106*a*, 106*b*, . . . 106*g*, 106*h* may also be powered-up or powered-down independently.

Lights 112*a*, 112*b*, 112*c*, 112*d* are disposed in the housing 101 directly adjacent each outlet pair. In some implementations the lights 112*a*, 112*b*, 112*c*, 112*d* may be LED lights, neon lights, and/or conventional lights. In the implementation shown in FIG. 1, each light 112*a*, 112*b*, 112*c*, 112*d* can be powered on when its adjacent outlet pair is powered-up, and may turn off when its adjacent outlet pair is powered-down. This allows visual confirmation of the function of the power-up and power-down sequence of the power strip 100, and confirmation as to which outlets 106*a*, 106*b*, . . . 106*g*, 106*h* are powered-up or powered-down. It will be appreciated that additional lights may be disposed within the housing 101, such as a light for each individual outlet 106*a*, 106*b*, . . . 106*g*, 106*h* if the outlets 106*a*, 106*b*, . . . 106*g*, 106*h* are individually powered-up or down (as opposed to in pairs, as in the example of FIG. 1).

Also disposed on a top surface of the housing 101 is a switch 124. In some implementations the switch 124 is operable to start the activation (i.e., power-up) of the outlets 106*a*, 106*b*, . . . 106*g*, 106*h* in a predetermined sequence. In some implementations, the switch is also operable to start the deactivation (i.e., power-down) of the outlets 106*a*, 106*b*, . . . 106*g*, 106*h* in a pre-determined sequence. The switch 124 can, for example, be a foot switch, such as an electromechanical foot switch including a elongated projection 123 and a cap 126 disposed on the elongated projection. In some implementations the switch 124 may be removably affixed to the housing 101 by a nut 128.

The switch 124 is operable to be toggled into the open or closed state by the application of a downward force onto the cap 126. This permits a user of the power strip 100 to easily initiate the power-up and/or power-down sequences. For instance, the power-up and/or power down sequences may be initiated by the application of pressure on the cap 126 by a foot or the sole of a shoe, boot, or the like. In some implementations, the switch 124 may be removably affixed to a support plate 136 that is secured to a top surface of the housing 101, where the support plate provides extra rigidity to the housing 101 and switch 124, which may increase reliability of the switch 124 even under substantial forces or loads pressing downward on the cap 126.

The sequential activation (i.e., power-up) and deactivation (i.e., power-down) of the outlets 106*a*, 106*b*, . . . 106*g*, 106*h* initiated by the switch 124 can occur using a pre-determined time delay between the activation and/or deactivation of each of the plurality of outlets. For instance, in the example power strip 100, after the switch 124 is toggled into a closed state, a pre-determined time delay may occur before the first outlet pair 106*a*/106*e* is powered-up, and again after the first outlet pair 106*a*/106*e* is powered-up but before the second outlet pair 106*b*/106*f* is powered, and so forth, until each of the outlet pairs are powered. In some implementations a similar pre-determined time delay may occur during power-down of the outlets, although the pre-determined time delay for the sequential activation may be different than the pre-determined time delay for the sequential deactivation. For instance, there may be a 2 second delay between the power-up of each outlet, and a 1 second (or 0 second) delay between the power-down of each outlet.

According to an implementation, a user can control the length of each pre-determined time delay using a timer input 138 disposed in the housing 101. Although only one timer input 138 is illustrated in FIG. 1, which may control both the time of the pre-determined power-up and power-down time delays, separate timer inputs may be disposed in the housing 101 and adjusted by the user to control the time of the pre-determined power-up and power-down time delays. According to an implementation, the timer input 138 can include a potentiometer that is rotatable by a user to adjust the time delay. According to another implementation, the timer input 138 can include a rotary binary coded dip switch that is rotatable by a user to adjust the time delay.

For instance, a user can turn the potentiometer or dip switch to adjust a time delay from 0 seconds to 15 seconds. The delay may be incremented in seconds, or may be incremented nearly infinitely depending on the user's adjustment of the timer input 138. In some implementations the timer input 138 can include a visual indicator, such as a line, indentation, arrow, or the like, that allows a user to view how the timer input 138 is set. Additionally, in some implementations, the housing 101 can include markings adjacent the visual indicator of the timer input 138. In some implementations the marking may represent the time delay, in seconds, between the power-up and/or power-down of the outlets 106*a*, 106*b*, . . . 106*g*, 106*h*. For instance, the housing 101 can include numbers from 1-15 surrounding the timer input 138, where the timer input 138 can be rotated and set to a marked position "0" for no time delay (i.e., all outlets 106*a*, 106*b*, . . . 106*g*, 106*h* are powered up and/or powered down at together), or rotated and set to a marked position "15" for a 15 second time delay in the power-up or power-down of the outlets 106*a*, 106*b*, . . . 106*g*, 106*h*. It will be appreciated that the user may adjust the time delay to virtually any length of time, and that the timer input 138 may provide delays much greater than 15 seconds, such as 1 minute, 10 minutes, an hour, or the like.

Figure 2:
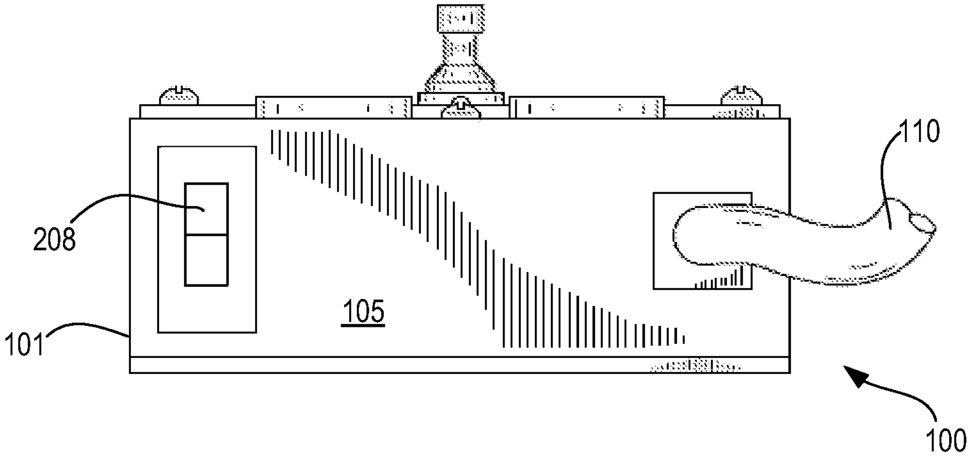
FIG. 2 shows an end view of the example power strip of FIG. 1.

FIG. 2 shows an end view of the second end 105 of the example power strip 100 of FIG. 1. The second end 105 includes an on/off switch 208, such a conventional toggle switch, disposed in the housing 101. The on/off switch 208 receives a power supply from the power cord 110 and can permit or prevent power from being supplied to the components within the power strip 100. Although not illustrated, in some implementations one or more lights may be disposed in the housing 101, such as in the first end 104 of the housing 101, that indicate when the power strip 100 is on. The on/off switch 208 may also include a light indicating whether the on/off switch 208 is in the on or off position. It should be appreciated that the outlets 106*a*, 106*b*, . . . 106*g*, 106*h* are not necessarily powered-up when the power strip 100 is on; rather, both the on/off switch 208 and switch 124 have to be toggled "on" prior to power-up the outlets 106*a*, 106*b*, . . . 106*g*, 106*h*. Conversely, toggling the on/off switch 208 to "off" prevents use of the power strip 100. In some implementations, the on/off switch 208 only provides power to a sequence control module, described in detail with respect to FIG. 5, and it does not power-up, or activate, the outlets 106*a*, 106*b*, . . . 106*g*, 106*h*.

Figure 3:
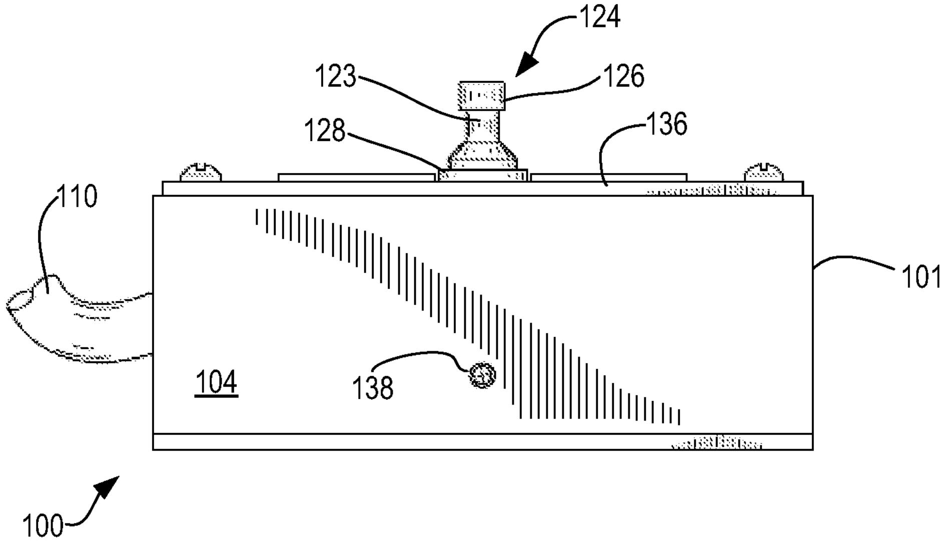
FIG. 3 shows an end view of another end of the example power strip of FIG. 1.

FIG. 3 shows an end view of the first end 104 of the example power strip 100 of FIG. 1. FIG. 3 shows another view of the switch 124 having, in some implementations, an elongated projection 123 and a cap 126 disposed on the elongated projection, where the switch 124 is removably affixed by a nut 128 to a support plate 136 secured to a top surface of the housing 101. In some implementations, the timer input 138 is disposed in the housing 101 on the first end 104, and may be rotated by a user.

In some implementations, the switch 124 defaults to an open state (i.e., or "off" position) when the power strip 100 is turned on, which happens when the strip 100 is powered by a power supply from the power cord 110 and when an on/off switch 208 is in an "on" position. In some implementations, the foot switch 124 can default to an "off" position when the on/off switch 208 of the power strip 100 is switched to an "on" position, regardless of the actual mechanical position of the switch 124.

Figure 4:
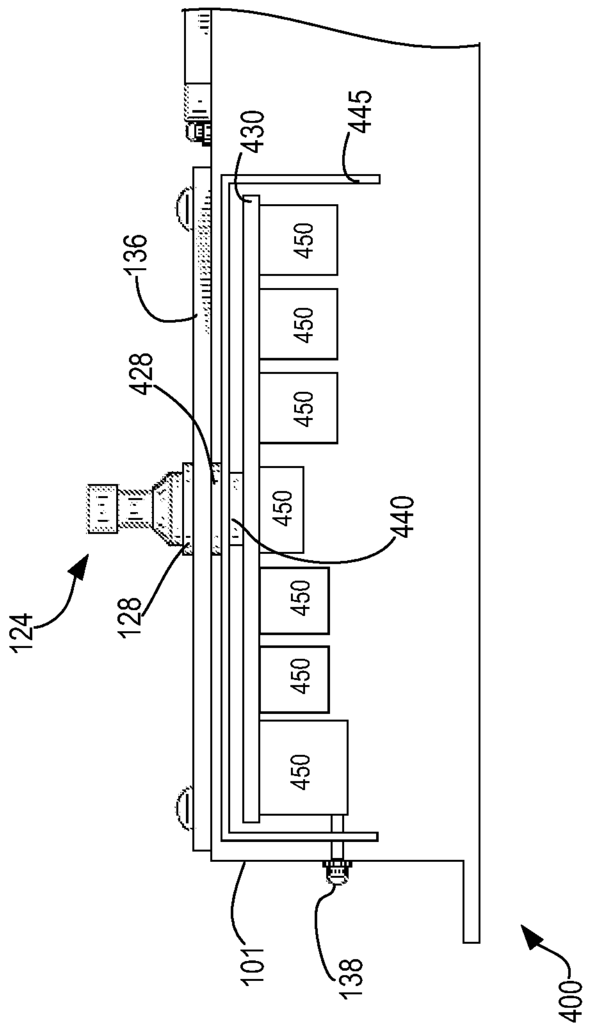
FIG. 4 shows a partial cross-section view of a switch and its connection to an electrical assembly of the example power strip of FIG. 1.

FIG. 4 shows a partial cross-section view 400 of the switch 124 and its connection to an electrical assembly of the example power strip 100 of FIG. 1. In some implementations, the switch 124 is affixed to an electrical substrate 430 carrying electrical components 450 (collectively, the substrate 430 and components 450 make up the electrical assembly) that control the operation of the power strip 100, including the sequence control module. For instance, the electrical substrate 430 can include a printed circuit board (such as FR-4) or similar rigid or flexible substrate to provide interconnections between components to form an electric circuit.

As shown in FIG. 4, in some implementations the switch 124 is attached directly to a central portion of the electrical substrate 430 at the bottom 440 of the switch 124, which can include leads that attach the switch 124 to the substrate 430. Additionally, in some implementations, the switch 124 affixes the electrical substrate 430 to the housing 101 at a substantially fixed distance from an interior surface of the housing 101. The switch 124 can be attached to a support plate 136 secured to a top surface of the housing 101 by a nut 128. In some implementations, another nut 428 can secure the switch 124 to a shield 445 that surrounds the electrical assembly, although it will be appreciated that the shield is optional. Where a shield 445 is used, the shield 445 may include one or more holes through which some electrical components may pass, such as a time input 138.

It will be appreciated that connecting the switch 124 to the electrical substrate 430 in a configuration that permits the switch 124 to affix the electrical assembly to the housing 101 results in a durable structure that increases the reliability of the switch 124, even under substantial forces or loads pressing downward on the cap 126.

Figure 5:
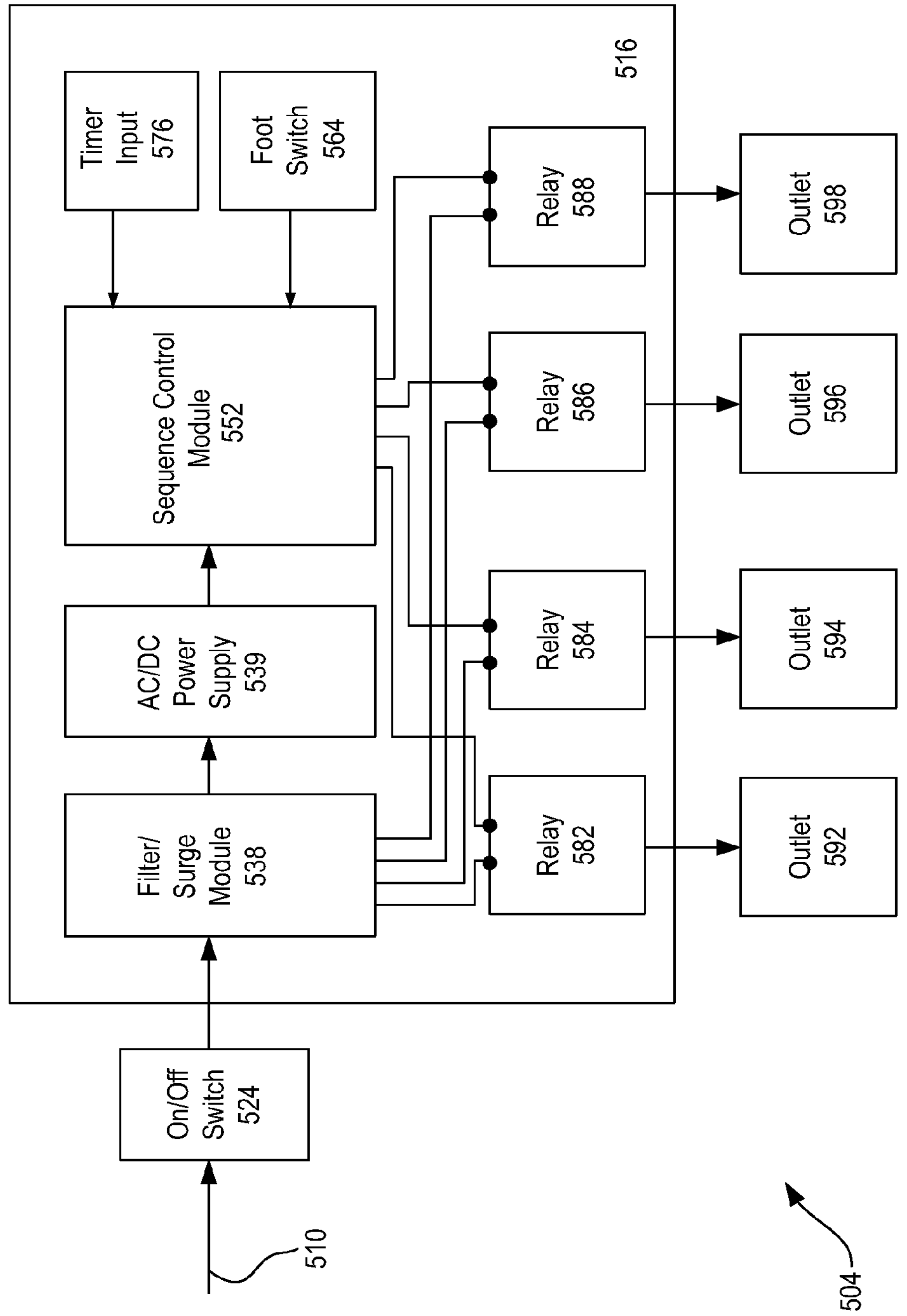
FIG. 5 is a block diagram of an example implementation of a power strip.

FIG. 5 is a block diagram 504 of an example implementation of the power strip. In some implementations, an on/off switch 524 receives AC power 510 from an external power source, and can be toggled to either permit or prevent power from being supplied to an electrical assembly 516 of the power strip 100. The AC power can be received at a filter/surge module 538 that is operable to provide power filtering and surge protection to the power strip. As illustrated, in some implementations the filter/surge module 538 can be electrically connected to relays 582, 584, 586, 588 and to an AC/DC power supply 539. In some implementations, the AC/DC power supply 539 receives filtered power from the filter/surge module 538 and provides a DC power source to the sequence control module 552.

The sequence control module 552 module is operable to activate the plurality of outlets 592, 594, 596, 598 in a sequence. In some implementations, the sequence control module 552 receives the timer input 576, which can include one or more timer inputs that establish a pre-determined time delay between the activation and/or deactivation of each of the outlets 592, 594, 596, 598. For instance, the timer input 576 can include a user-adjustable potentiometer to allow a user to set the pre-determined time delay between both the activation and deactivation of the outlets 592, 594, 596, 598. According to another implementation, the timer input 576 can include two user-adjustable potentiometers to allow a user to set a first pre-determined time delay for the activation (i.e., power-up) of the outlets 592, 594, 596, 598, and a second time delay for the deactivation (i.e., power-down) of the outlets 592, 594, 596, 598.

The sequence control module 552 also receives input from a foot switch 564, such as the foot switch 124. When the foot switch 564 is toggled on, the sequence control module 552 can sequentially transmit signals to the relays 582, 584, 586, 588 in a predetermined sequence to control the power-up and power-down of the outlets 592, 594, 596, 598. According to some implementations, each relay is associated with a respective outlet (or pair of outlets, such as in the example power strip 100) such that power to each outlet is supplied through the respective relay associated with that outlet. When a particular outlet is to be powered-up according to the predetermined sequence, the sequence control module 552 transmits a signal energizing the relay associated with that outlet, permitting power to flow from the filter/surge module 538 to the outlet. Similarly, when a particular outlet is to be powered-down according to the predetermined sequence, the sequence control module 552 de-energizes the relay associated with that outlet, preventing power from flowing from the filter/surge module 538 to the outlet.

In some implementations, the sequence control module 552 can deactivate, or power-down, the outlets 592, 594, 596, 598 in a sequence that is the reverse of the sequence to activate, or power-up, the outlets 592, 594, 596, 598. Additionally, the sequence control module 552 may be operable to deactivate the outlets 592, 594, 596, 598 in a sequence that is the reverse of the sequence to activate the outlets 592, 594, 596, 598, even if only some of the plurality of outlets have been activated. This may occur, for instance, if the foot switch 564 is toggled rapidly from the "on" to the "off" position before the activation sequence is completed.

To effect the sequence control, the sequence control module 552 can include, for instance, a microcontroller, such as a programmable flash device. The processes and logic flows of the sequence control module 552 can also or alternatively be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 6:
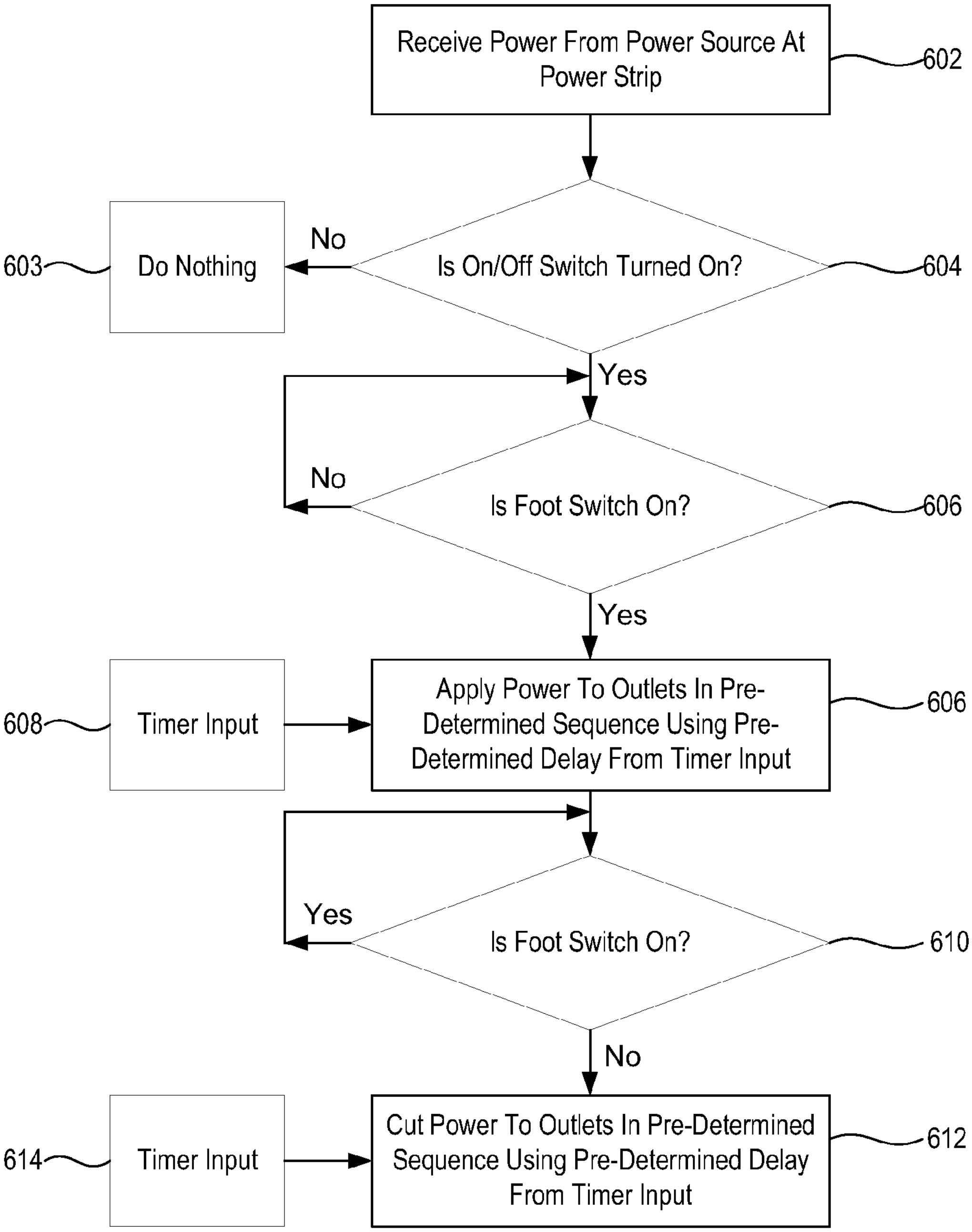
FIG. 6 is a flow chart of an example operation of a power strip.

FIG. 6 is a flow chart of an example operation of a power strip of the present invention. Power is received from a power source at a power strip of the present invention (602). According to some implementations, an on/off switch is either in the "on" or "off" position (604). If the on/off switch is "off", nothing is done (603) because the power supply is inoperable. According to some implementations, an foot switch is either in an "on" or "off" state (606). If the on/off switch is "on", and the foot switch is "off" then nothing happens until the foot switch is toggled to the "on" position. If the on/off switch is "on", and the foot switch state is changed to "on", then power is applied to outlets in a pre-determined sequence using a pre-determined time delay (606) set provided by a timer input (608). For instance, a user can establish the timer input by adjusting a potentiometer on the power strip. If the foot switch remains in the "on" state, then nothing happens, though power remains in the outlets that were previously activated. If the foot switch state is changed to "off", then power is cut to outlets in a pre-determined sequence using a pre-determined time delay (612) set provided by a timer input (614). For instance, a user can establish the timer input by adjusting a potentiometer on the power strip, and this timer input may be the same or different from the timer input (608) that determined the delay in applying power to the outlets (606).

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A power strip, comprising:

a housing;

a plurality of outlets disposed in the housing and operable to receive a plurality of plugs;

a sequence control module, wherein the sequence control module is operable to:

activate the plurality of outlets in a first sequence including a first pre-determined time delay between the activation of each of the plurality of outlets; and deactivate the plurality of outlets in a second sequence including a second pre-determined time delay between the deactivation of each of the plurality of outlets;

a switch operable to selectively start the activation of the plurality of outlets in the first sequence and the deactivation of the plurality of outlets in the second sequence;

a first timer input, wherein the first timer input establishes the length of time of the first pre-determined time delay; and a second timer input, wherein the second timer input establishes the length of time of the second pre-determined time delay.

2. The power strip of claim 1, wherein the switch is a manually operated switch that can be toggled into an open or closed state.

3. The power strip of claim 2, wherein the switch is a foot switch comprising an elongated projection and a cap disposed on the elongated projection, wherein the foot switch is operable to be toggled into the open or closed state by the application of a downward force onto the cap.

4. The power strip of claim 3, further comprising an on/off switch operable to power the sequence control module on or off.

5. The power strip of claim 1, wherein the second sequence to deactivate the plurality of outlets is a sequence that is the reverse of the first sequence to activate the plurality of outlets.

6. The power strip of claim 5, wherein the sequence control module is operable to deactivate the plurality of outlets in the second sequence that is the reverse of the first sequence to activate the plurality of outlets, even if only some of the plurality of outlets have been activated.

7. The power strip of claim 1, wherein:

the plurality of outlets comprise a plurality of pairs of outlets; and the sequence control module is further operable to activate the plurality of outlets in the first sequence such that the pair of outlets in each of the plurality of pairs of outlets are activated together.

8. The power strip of claim 7, wherein:

the sequence control module is further operable to deactivate the plurality of outlets in the second sequence such that the pair of outlets in each of the plurality of pairs of outlets are deactivated together.

9. The power strip of claim 8, wherein the sequence control module is operable to deactivate the plurality of outlets in the second sequence such that the pair of outlets in each of the plurality of pairs of outlets are deactivated together, even if only some of the plurality of outlets have been activated.

10. The power strip of claim 1, wherein the first pre-determined time delay is a time delay other than the second pre-determined time delay.

11. The power strip of claim 10, wherein the first pre-determined time delay is greater than the second pre-determined time delay.

12. The power strip of claim 10, wherein the first pre-determined time delay is less than the second pre-determined time delay.

13. A power strip with an integrated sequence control module, comprising:

a substantially rectangular housing defining a top surface;

a plurality of outlets disposed in the housing and operable to receive a plurality of plugs;

a sequence control module disposed in the housing;

an on/off switch operably disposed on the housing, wherein the on/off switch is toggleable between:

(a) on position in which the on/off switch is operable to power source to provide power to the sequence control module; and (b) an off position in which the on/off switch is operable to prevent the power source from providing power to the sequence control module;

a first timer input disposed in the housing, wherein the first timer input is operable to control a power up time delay;

a second timer input disposed in the housing, wherein the second timer input is operable to control a power down time delay; and a foot switch disposed in the housing adjacent the top surface, wherein:

the foot switch is operable to cause the sequence control module to activate the plurality of outlets in a first sequence when the plurality of outlets are powered on;

the foot switch is operable to cause the sequence control module to deactivate the plurality of outlets in a second sequence when the plurality of outlets are powered off;

the sequence control module is operable to activate the plurality of outlets in the first sequence including the power up time delay between the activation of the plurality of outlets at least partially in response to actuation of the foot switch, when the plurality of outlets are powered off and the on/off switch is in the on position; and the sequence control module is operable to deactivate the plurality of outlets in the second sequence including the power down time delay between the deactivation of the plurality of outlets at least partially in response to actuation of the foot switch when the plurality of outlets are powered on and the on/off switch is in the on position.

14. The power strip of claim 13, wherein the second sequence is a sequence that is a reverse of the first sequence.

15. The power strip of claim 14, wherein the sequence control module is operable to deactivate the plurality of outlets in the second sequence, even if only some of the plurality of outlets have been activated.

16. The power strip of claim 15, wherein the sequence control module is operable to deactivate the plurality of outlets in the second sequence, even in response to actuation of the foot switch before the first sequence is completed.

17. The power strip of claim 13, wherein:

the foot switch comprises:

an elongated projection that extends substantially perpendicularly from the top surface of the housing; and a cap disposed on the elongated projection; and the foot switch is operable to be actuated in response to an application of a downward force on the cap.

18. The power strip of claim 13, wherein:

the plurality of outlets comprise a plurality of pairs of outlets; and the sequence control module is further operable to activate the plurality of outlets in the first sequence such that the pair of outlets in each of the plurality of pairs of outlets are activated together.

19. The power strip of claim 18, wherein:

the plurality of outlets comprise a first pair of outlets, a second pair of outlets disposed adjacent the first pair of outlets, a third pair of outlets disposed adjacent the second pair of outlets, and a fourth pair of outlets disposed adjacent the third pair of outlets;

the first pair of outlets, the second pair of outlets, the third pair of outlets, and the fourth pair of outlets are arranged adjacent the top surface such that the first pair of outlets, the second pair of outlets, the third pair of outlets, and the fourth pair of outlets form a four outlet by two outlet grid of outlets; and the first sequence comprises the first pair of outlets followed by the second pair of outlets followed by the third pair of outlets followed by the fourth pair of outlets.

20. The power strip of claim 18, wherein:

the sequence control module is further operable to deactivate the plurality of outlets in the second sequence such that the pair of outlets in each of the plurality of pairs of outlets are deactivated together.

21. The power strip of claim 20, wherein the sequence control module is operable to deactivate the plurality of outlets in the second sequence such that the pair of outlets in each of the plurality of pairs of outlets are deactivated together, even if only some of the plurality of outlets have been activated.

22. The power strip of claim 13, wherein the power strip is operable to default the foot switch to an off position in response to the on/off switch moving to an on position.

* * * * *